United States Patent
Wei et al.

(10) Patent No.: US 7,498,977 B2
(45) Date of Patent: Mar. 3, 2009

(54) FIELD PROBE FORM THE ANGULAR RESPONSE OF A RIGID BODY

(75) Inventors: Pax S. P. Wei, Sammamish, WA (US);
Anthony W. Reed, Seattle, WA (US);
Craig N. Ericksen, Renton, WA (US);
James D. Doty, Issaquah, WA (US);
Robert K. Schuessler, Covington, WA (US)

(73) Assignee: The Boeing Company, Chicago, IL (US)

( * ) Notice: Subject to any disclaimer, the term of this patent is extended or adjusted under 35 U.S.C. 154(b) by 167 days.

(21) Appl. No.: 11/465,417

(22) Filed: Aug. 17, 2006

(65) Prior Publication Data

US 2009/0033546 A1    Feb. 5, 2009

(51) Int. Cl.
*G01S 7/40*    (2006.01)
*G01S 13/00*    (2006.01)

(52) U.S. Cl. .............. 342/165; 342/173; 342/174; 342/196

(58) Field of Classification Search ............. 342/61–72, 342/75, 114, 115, 165, 173, 174, 190, 194, 342/195, 196, 359, 419; 74/840, 813 R
See application file for complete search history.

(56) References Cited

U.S. PATENT DOCUMENTS

| | | | |
|---|---|---|---|
| 4,860,016 A | 8/1989 | Westphal et al. | |
| 4,879,560 A | 11/1989 | McHenry | |
| 4,901,080 A | 2/1990 | McHenry | |
| 5,075,681 A * | 12/1991 | Kartiala | 342/165 |
| 5,386,737 A | 2/1995 | Soeder et al. | |
| 6,556,023 B2 | 4/2003 | Okazaki | |
| 6,744,400 B1 * | 6/2004 | Wei et al. | 342/165 |

OTHER PUBLICATIONS

Garat (Electrotechnical Conference, 1996. MELECON '96., 8th Mediterranean, May 13-16, 1996, vol. 1, On pp. 80-86).*
Wei et al.[2] (Wideband radar echoes from cylindrical rods, Antennas and Propagation Society International Symposium, 1999. IEEE, vol. 2, Jul. 11-16, 1999 pp. 1418-1421).*
Lahaie et al. (Scattering of electromagnetic waves by a slowly rotating rectangular metal plate, Antennas and Propagation, IEEE Transactions on [legacy, pre—1988], vol. 27; Issue: Jan. 1, 1979, pp. 40-46).*

(Continued)

*Primary Examiner*—Thomas H Tarcza
*Assistant Examiner*—Peter M Bythrow
(74) *Attorney, Agent, or Firm*—Klein, O'Neil & Singh, LLP (57) ABSTRACT

Probing incident radar fields in a target test zone of a RCS test facility by exploiting angular radar response of a long and uniform rigid body supported horizontally across or vertically through the test zone. The rigid body is free to rotate about the broadside condition. Thus, the angle of the rigid body is gradually changed with respect to the direction of arrival of the incident wave. Radar echo from the rigid body is measured as a function of the rigid body angle. The data is then processed to yield a profile of the incident wave intensity along the rigid body. By varying the azimuth angle continuously while recording radar data, the data may be processed by the fast Fourier transform (FFT) algorithm to yield a profile of the incident wave intensity along the rigid body.

21 Claims, 11 Drawing Sheets

OTHER PUBLICATIONS

W. H. Press, S. A. Teukolsky, W. T. Vetterling, and B. P. Flannery, "Numerical Recipes in C.," (Cambridge Univ. Press, 2nd ed., 1992, reprinted 1999), pp. 553-556; also, same authors, "Numerical Recipes in FORTRAN," (2nd ed., 1992), pp. 547-548.

P.S.P. Wei, A.W. Reed, and C.N. Ericksen, "Radar Cross Section Measurements Amid Interfering Backgrounds" Proc. 22nd AMTA, (2000), pp. 99.

Silz, R.; "Design of the GE aircraft engine compact range facility", Antennas and Propagation Society International Symposium, 2001. IEEE, vol. 4, Jul. 8-13, 2001 pp. 432-435.

Scheer, J.A.; Chastain, W.E., Alexander, N.T.; Bruder, J.A.; Scheer, C.R.: Horst,M.M.; Trostel, J.M.;"MMW radar cross section range characterizes targets"; Radar Conference, 1988., Proceedings of the IEEE National , Apr. 20-21, 1988 pp. 209-213.

Knott, E. F. et al., "Broadside Radar Echoes from Wires and Strings," Microwave Journal, vol. 42, Jan. 1999, pp. 102, 104, 106, 108 and 110.

Knott, E. F., "Radar Cross Section Measurements," Van Nostrand Reinhold, New York, 1993, pp. 326-338.

Mensa, D. L., "High Resolution Radar Cross-section Imaging," Artech House, Boston, 1991, pp. 115-116.

Wei, P. S. P., "Discrete Hilbert Transform and Analytic Envelope," Boeing Document D180-32736-1, Apr. 16, 1991 pp. 1-29, (unpublished).

Wei, P. S. P., "Study of DFT Windows for Radar Imaging," Proc., 17.sup.th Antenna Measurement Techniques Association (AMTA), Williamsburg, VA, Nov. 13-17, 1995, pp. 111-116.

Wei, P. S. P. et al., "Study of Wires and Strings of Finite Sizes," Proc., 20.sup.th Antenna Measurement Techniques Association (AMTA), 1998, pp. 221-226.

Wei, P. S. P. et al.,"Uncertainty Analysis on the RCS Measurements from Calibration Objects," Proc. 23d Antenna Measurement Techniques Association (AMTA), Symposium, Denver, CO, Oct. 22-26, 2001, pp. 123-128.

E. F. Knott and P. S. P. Wei, "The Long String as a Field Probe," IEEE Antennas and Porpagation Magazine, accepted for publication (2005): also presented at the AMTA Symposium, (Newport, R.I., Nov. 1st), Proc. 27th AMTA, pp. 136-141 (2005).

P. S. P. Wei, A. W. Reed, C. N. Ericksen, and M. D. Bushbeck, "Study of RCS Measure-ments from a Large Flat Plate," Proc. 27th AMTA, pp. 3-8 (2005).

P. S. P. Wei, A. W. Reed, And C. N. Ericksen, "VHF Capability and RCS Measurements from Long Cylinders," Proc. 24th AMTA, pp. 192-197 (2002).

* cited by examiner

FIELD PROBE FORM THE ANGULAR RESPONSE OF A RIGID BODY

BACKGROUND

1. Field of the Invention

This invention relates generally to test ranges and, more specifically, to radar test ranges.

2. Related Art

A radar cross-section (RCS) test range is a facility for measuring radar scattering properties of test objects, such as aircraft and missiles. Radar cross-section test ranges have been built to provide a "quiet" test zone for measuring radar signature of a test object. "Quiet" means that the incident radar wave in the test zone is acceptably free from undesired interference or unwanted reflections from elsewhere in or on the test range.

Operating conditions of a test range can change over time, with changes of equipment, and with arrangement of radar absorbers. Thus, it is considered good practice to probe the test zone of the range at regular intervals to ensure that radar fields within the test zone behave as expected. Unfortunately, the time and equipment required for field probing can places additional cost burdens on test programs. Without a probe of the test range, actual measurements remain unquantified.

Thus, there is a need for a fast, accurate, and cost effective method of performing a field probe.

SUMMARY OF THE INVENTION

The present invention allows probing incident radar fields in a target test zone of a RCS test facility. The present invention accomplishes probing by exploiting angular radar response of a long and uniform rigid body support horizontally across or vertically through the test zone. The rigid body is rotated about the broadside condition. Thus, the angle of the rigid body is gradually changed with respect to the direction of arrival of the incident wave. Radar echo from the rigid body is measured as a function of the rigid body angle. Only the size of the rigid body itself is exposed to the incident wave. The data is then processed to yield a profile of the incident wave intensity along the rigid body. This probing can be routinely achieved for any desired frequency.

By varying the azimuth angle continuously while recording radar data, the data may be processed by the fast Fourier transform (FFT) algorithm to yield a profile of the incident wave intensity along the rigid body.

Processing the radar data by FFT yields a spectrum which can be interpreted as a representation of the field distribution along the length of the target, provided that the rigid body is long and uniform in its scattering behavior per unit length.

In one aspect of the invention, a method is provided for determining characteristics of a radar wave field in a radar test range. The method includes suspending a rigid body approximately perpendicular to direction of travel of expected incident radar waves; rotating the rigid body with respect to the direction of travel of the generated incident radar waves; and collecting return information of the rigid body based on a sensed angle of the rigid body relative to the incident radar waves at a desired frequency.

In yet another aspect of the invention, a system is provided for determining characteristics of a radar wave field in a radar test range. The system includes a radar system configured to generate incident radar waves at a desired frequency in a direction approximately perpendicular to a suspended rigid body; and a device configured to rotate the rigid body with respect to the direction of travel of the generated incident radar waves.

In yet another aspect of the present invention, a radar test range is provided having a wave field, where the radar test range includes a rigid body suspended approximately perpendicular to the direction of travel of an expected incident radar wave, the rigid body configured to rotate in-and-out of the broadside condition; a radar for generating incident radar waves at a desired frequency in a direction approximately perpendicular to the rigid body; and a processor coupled for collecting return information of the rigid body from a sensor based on the sensed angle of the rigid body.

Advantageously, the field probing technique of the present invention may be used with any long and uniform test object body, such as a rod or flat plate. The symmetry of the test object is not restricted, which means the test object can be cylindrical or flat in shape. Moreover, the test object can be made of any material, such as a metal or a dielectric.

The test object does not have to be anchored on one side of the test chamber, but rather it can be allowed to freely rotate within the test field. Since the test object can be relatively broad, the field sampled is an average over the height (or width perpendicular to the longitudinal dimension) of the test object. Accordingly, the test object makes the field probing a practical exercise since sampling one time is enough to complete the probe. Finally, cross-range calibration using a previously derived equation is verified from the known length of the uniform test object.

Additional advantages, objects, and features of the invention will be set forth in part in the detailed description which follows. It is to be understood that both the foregoing general description and the following detailed description are merely exemplary of the invention, and are intended to provide an overview or framework for understanding the nature and character of the invention as it is claimed.

BRIEF DESCRIPTION OF THE DRAWINGS

The accompanying drawings are included to provide further understanding of the invention, illustrate various embodiments of the invention, and together with the description serve to explain the principles and operation of the invention. In the drawings, the same components have the same reference numerals. The illustrated embodiment is intended to illustrate, but not to limit the invention. The drawings include the following Figures.

DETAILED DESCRIPTION

Figure 1:
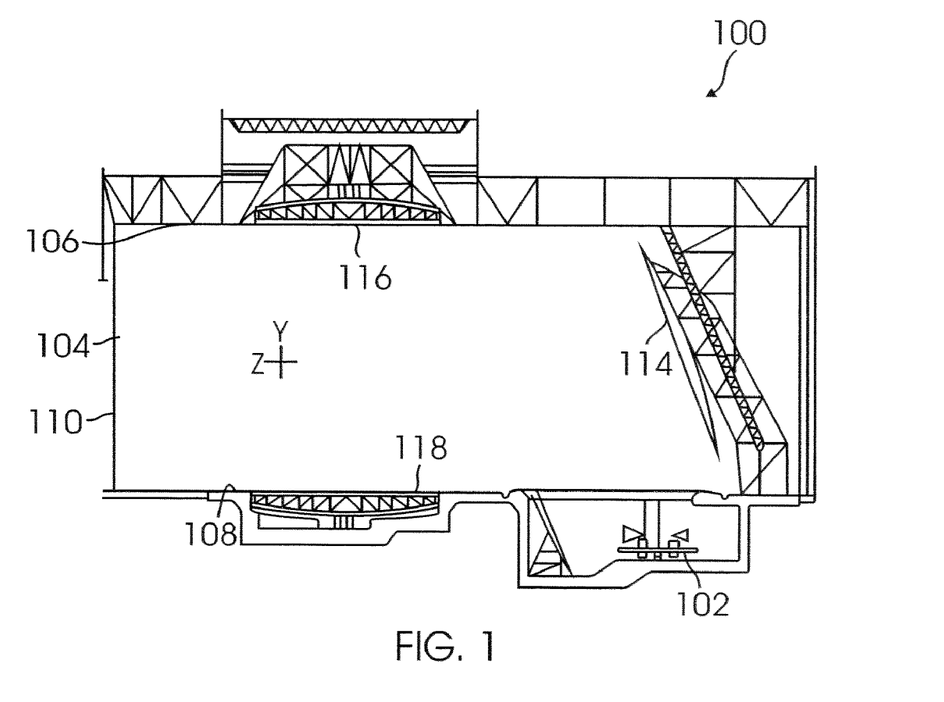
FIG. 1 is a cross-sectional view of radar test range.

FIG. 1 is a cutaway side view of an example radar test range 100 in accordance with the present invention. Range 100 includes a radar system 102 that transmits a radar signal at a predetermined frequency, pulse width, pulse repetition rate, or scan pattern into a test zone 104. Test zone 104 is defined by the space within a ceiling 106, a floor 108, an end wall 110, and sidewalls (not shown). Floor 108 and ceiling 106 include turntables that provide motion for test objects. Although radar test range 100 is shown as an indoor range, radar test range 100 may be an outdoor range.

Test zone 104 is a space defined by x, y, and z-axes. The z-axes extends from a main radar reflector 114 of radar system 102 to the end wall 110. The y-axis is orthogonal to the z-axis and extends between ceiling 106 and floor 108. The x-axis is orthogonal to the y and z-axes.

Figure 2:
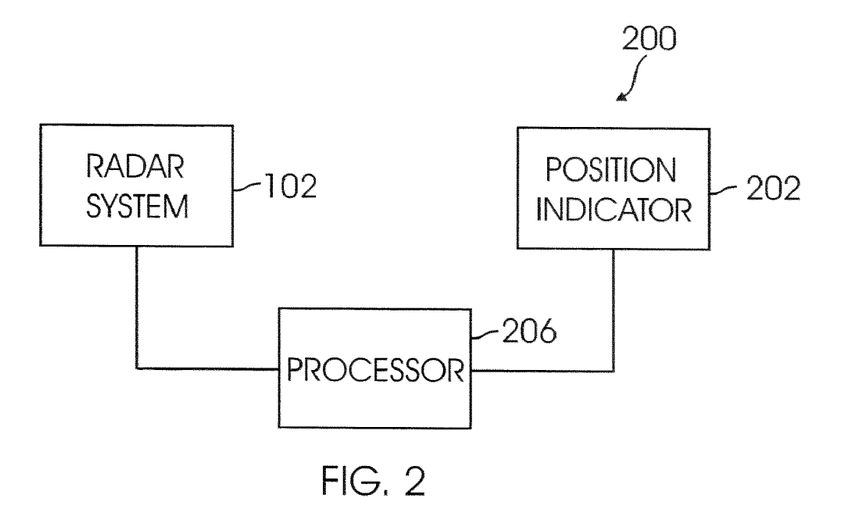
FIG. 2 is a block diagram of components of the present invention.

FIG. 2 is a block diagram of a system 200 formed in accordance with the present invention for analyzing a test zone of a test range, such as test zone 104 of test range 100. System 200 includes a radar system, such as radar system 102, a position indicator 202, and a processor 206. Radar system 102 sends an incident wave (radar signal) towards a linear scatterer, such as a rigid body (not shown) mounted within test zone 104. The incident radar wave propagates along the z-axis to produce a substantially flat incident wave, to simulate a far field situation. Processor 206 receives radar return data of the rigid body. Processor 206 also receives position information of the rigid body from the rigid body position indicator 202. Processor 206 generates an analysis of test zone 104 to determine properties of the far field radar signal.

Figure 3A:
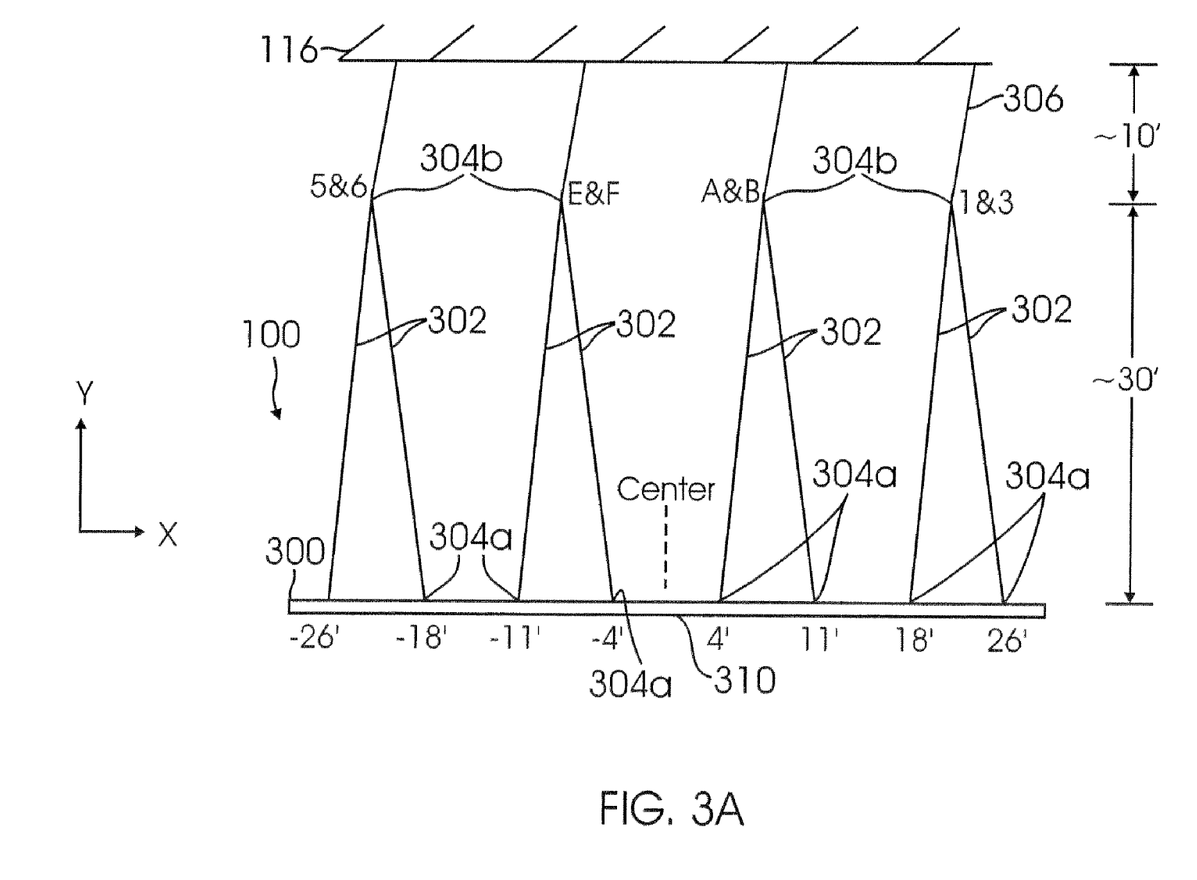
FIG. 3A is a simplified schematic representation (front-view) of components of the present invention.

FIG. 3A is a schematic representation (front-view) of components of the present invention. Rigid body 300 is suspended horizontally across range 100 using a suspension mechanism 302, such as strings. In one exemplary embodiment, tests were conducted using a rigid body 300, which is a solid rod ranging in length to about 60 feet with a diameter of about 1.74 inches. In this example, the solid rod weighs about 75 pounds, and is supported by eight pairs of strings 302 coupled) at eight attachment points 304a distributed along its length. Attachment points 304a occur at approximately +4, +11, +18, and +26 feet from the center of rigid body 300.

Figure 3B:
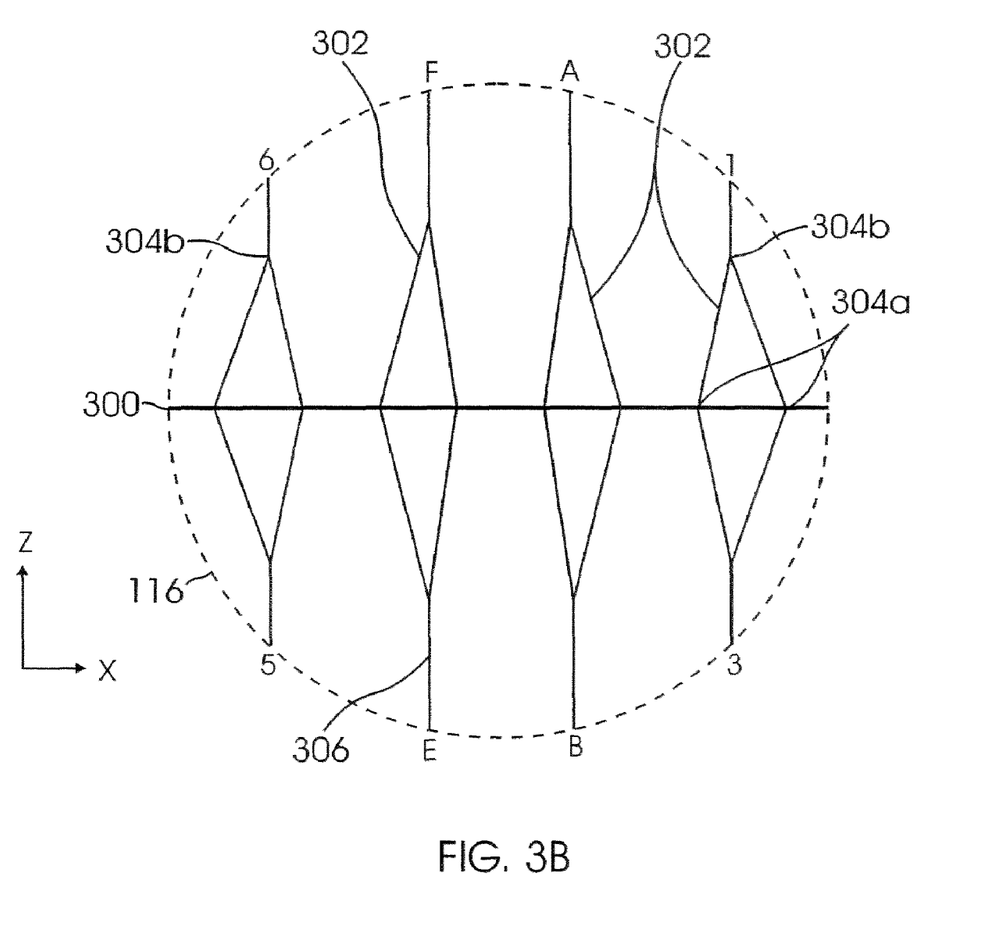
FIG. 3B is a simplified schematic representation (top-view) of components of the present invention.

FIG. 3B is a schematic representation (top-view) of components of the present invention. In this example, the eight pairs of strings 302 (thin) may be 30-pound testing arranged at non-flashing angles to the radar. In one embodiment, tie-points 304b are coupled to heavier cables 306 (medium) from upper turntable or UTT 116. Tie-points 304b may be located at any suitable height, for example, at about 30 feet above the quiet-zone center line. In one embodiment, the eight strings 302 are divided into four each of high-capacity (denoted A, B, E, and F, each can support 3000 pounds maximum) and low-capacity (denoted 1, 3, 5, and 6, each can support 300 pounds maximum). Strings 302 may be positioned inside and around the rim of UTT 116, for example, positioned just one foot inside the rim and around UTT 116. In one embodiment, UTT is approximately 60 feet in diameter. It should be understood that strings 302 may be gradually tightened and their tensions evenly adjusted step-by-step for balancing rigid body 300. It should also be understood that, as illustrated in FIG. 3A, neither end of rigid body 300 is attached or otherwise fixed to any structure, but is configured to freely rotate as UTT 116 is made to rotate about its center.

Alternatively, rigid body 300 can include various geometric shapes, such as a cylinder, and a square flat-plate. As discussed below, tests were conducted on a 20-foot long cylinder having a diameter of about 4.00 inches, with the two ends each covered by a flat plate. Tests were also conducted on a large flat plate, which was 8-feet square.

It can be appreciated that the rigid body 300 can be attached to side walls in the test range in order to test incident waves in the vertical plane. The rigid body 300 can be setup between any horizontal and vertical angles. It can also be appreciated that the center of the rigid body may or may not be aligned with the center of the quiet zone.

Figure 4:
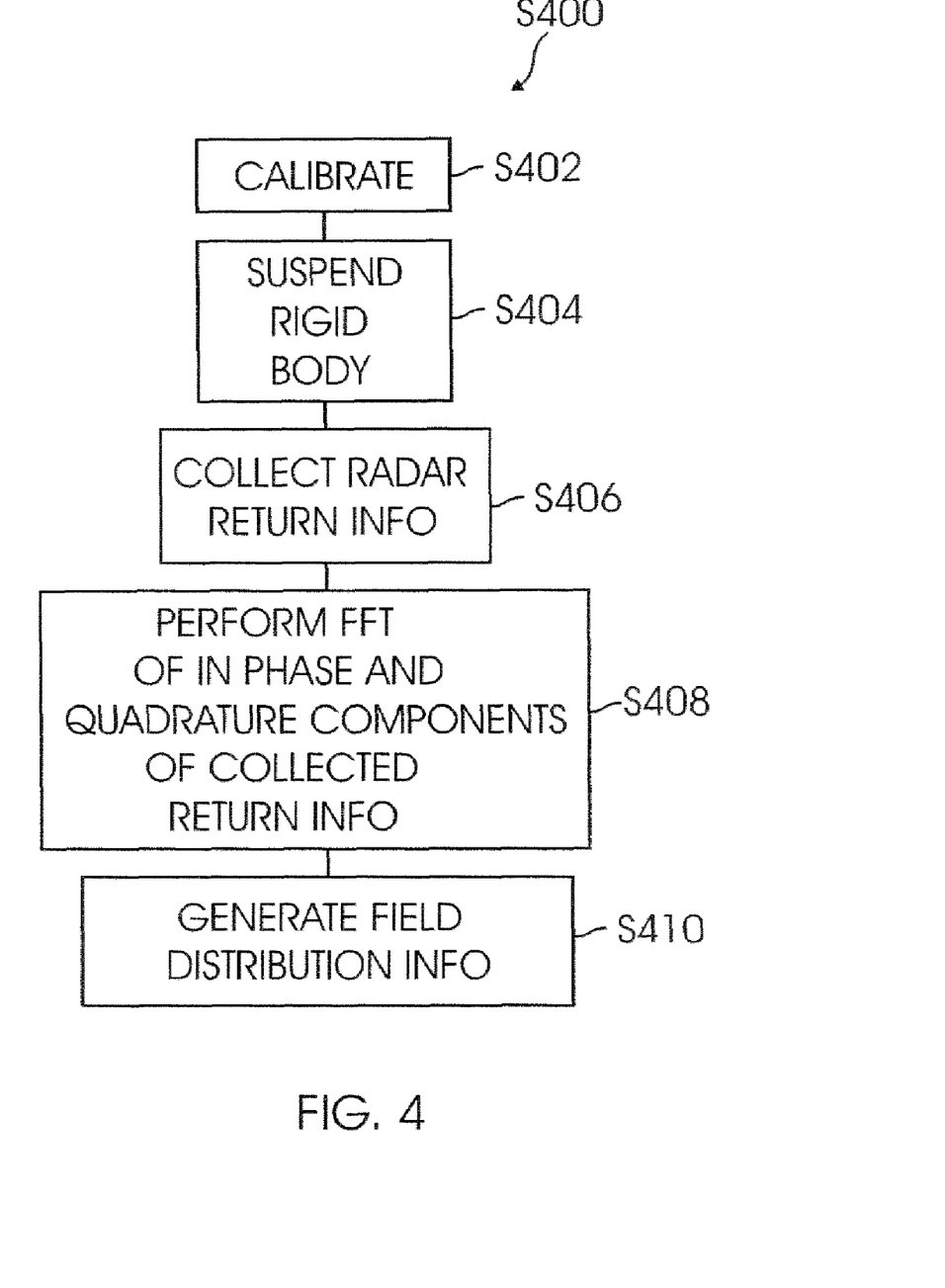
FIG. 4 is a flow diagram illustrating a process for determining test zone characteristics in accordance with an embodiment of the present invention.

FIG. 4 illustrates an exemplary process s400 performed by system 200 (FIG. 2). Process 400 begins by performing a calibration of radar system 102 (s402). Calibration of radar system 102 is performed by known calibration methods.

In s404, rigid body 300 is suspended within the radar range approximately orthogonal to the direction of travel of an incident wave produced by radar system 102.

In step s406, radar system 102 collects radar return information of rigid body 300 at the predetermined frequency while rigid body 300 is rotated about a center 310 of rigid body 300 between predefined threshold angles out-of-plane with the incident wave. It will be appreciated that radar system 102 steps the frequency of the incident wave through a plurality of frequencies as rigid body 300 is being rotated.

Next, in step s408, the collected frequency return information is processed using FFT of in phase and quadrature components of the collected return information.

In step s410, field distribution information is generated by converting each range bin number result of the FFT to a distance value.

It will be appreciated that the frequency of the generated incident wave can be varied (i.e., stepped. By varying the frequency while rigid body 300 is rotated, radar return information of the moving rigid body 300 can be attained for a plurality of frequencies at the same time.

EXAMPLE

Figure 5:
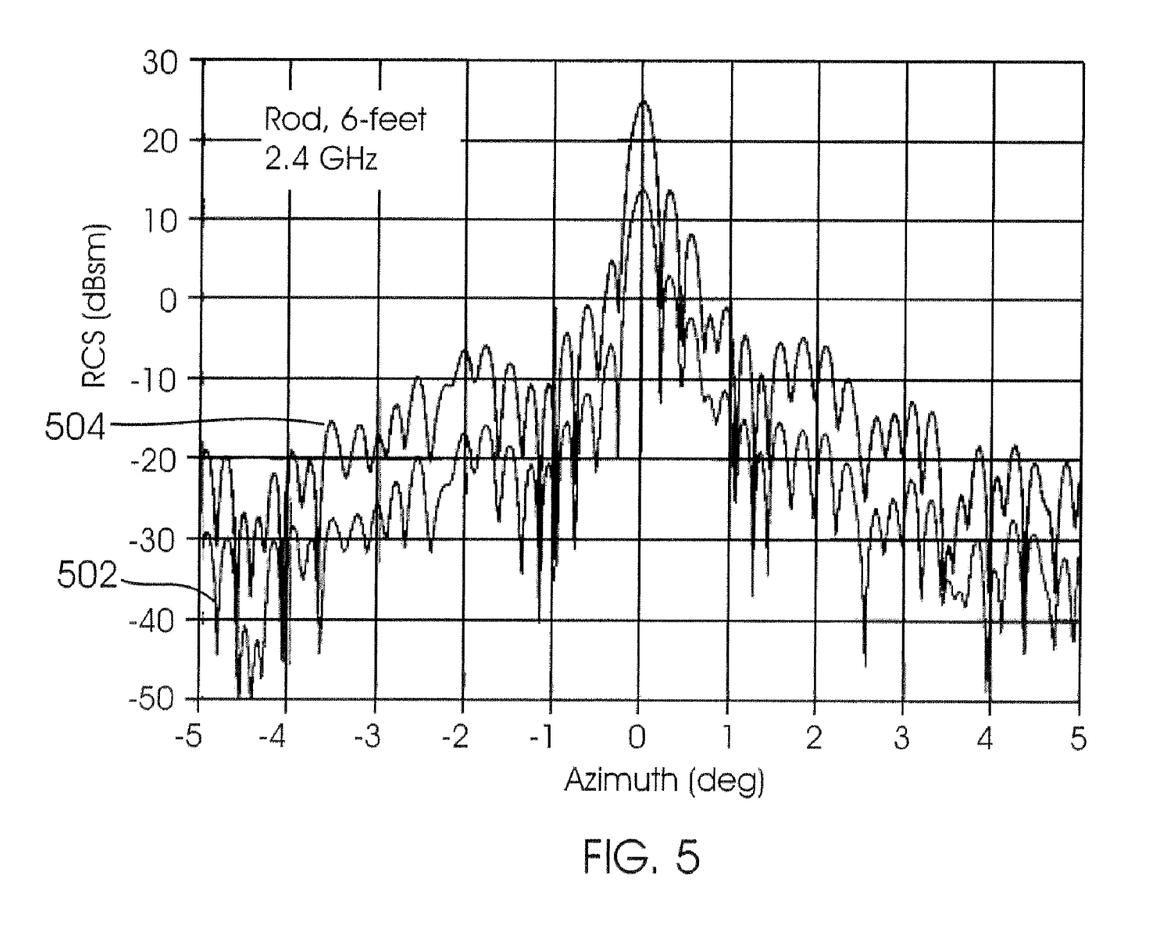
FIG. 5 is a measured RCS pattern versus azimuth of a rigid body suspended within a radar test range in accordance with an embodiment of the present invention.

In the following example, 1.74-inch diameter rod, made of galvanized thin-wall steel was used as rigid body 300. The rod measured 60 feet and was suspended in a horizontal plane from upper turntable (UTT) 116. When UTT 116 is rotated, the angle between rigid body 300 and the direction of arrival of the incident radar wave is changed, thereby varying radar response of rigid body 300. An example of the angular radar response in a test range is as shown in FIG. 5 for a frequency of 2.4 GHz and vertical transmit/vertical receive (VV) polarization. The angular radar response (echo) is charted in logarithmic scale in decibels-square meter (dBsm). FIG. 5 shows the typical azimuth dependence of the radar echoes at 2.4 GHz from the 60-foot long rod. Radar response (echo) is strongest within a narrow angular range. The independent variable is the UTT-angle, which within a small inclination (.+−.10.degree.) from the vertical plane normal to the incident wave direction, is linearly proportional to the out-of-plane angle subtended by rigid body 300 and the vertical plane. The UTT-angle for the broadside condition is defined as zero. Only the sections within ±5° of broadside are shown. The main peak is very narrow. The side-lobes are asymmetric. Note that the VV trace 502 is shifted down by −10 dB to avoid overlap, and that it is very similar to the HH trace 504.

swept (in radian), c is the speed of light, and W is a conversion factor which relates the UTT-angle to the actual out-of-plane angle for the rotation (if needed).

In Equation (1), R and J have a unique relationship, once all the other parameters are know. If the rod length is also known, for example here 720 inches, then the point is picked at −13 dB down from the outer-most Gibb's peak on the left (bin_1) and right (bin_2), as denoted by a short bar.

Figure 8:
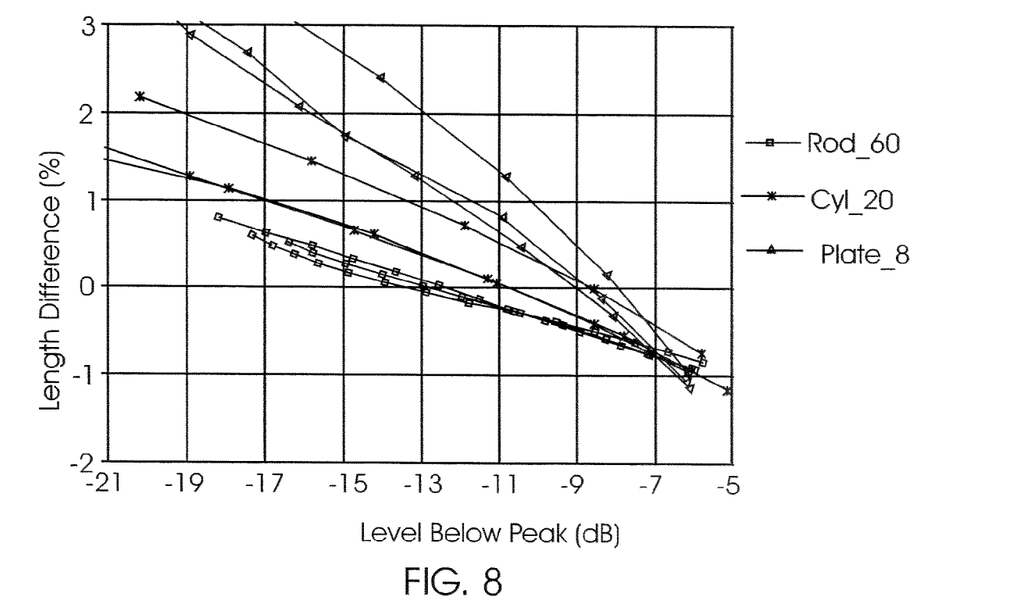
FIG. 8 shows a summary of distance calibrations in the Fourier transform spectra for three rigid bodies of different lengths in accordance with an embodiment of the present invention.

Such exercises have been carried out for other types of rigid bodies, namely a cylinder and a flat plate. FIG. 8 shows a plot on the length difference (%) versus the level below peak. Table 1 below gives a summary on the numerical data used in the cross-range calibrations. Note that the length is always positive, though Bin_1 and X1 both have a "−" sign in front. Various choices of window functions in the Fourier transform may mitigate the effect on the Gibb's phenomena, but not completely eliminate it.

TABLE 1

Summary on the calibration of cross-range distances in the Fourier transform spectra for the three rigid bodies, All angular ranges are ±20°, for the HH eases only.

| Object (Freq) | Data Points | dB (Down) | Bin_1 | X1 (inch) | Bin_2 | X2 (inch) | Length (X2-X1) | Error (%) |
|---|---|---|---|---|---|---|---|---|
| Rod (60-foot length, 1.74-inch diameter) | | | | | | | | |
| 2.0 | 2180 | −12.5 | −639.35 | −359.40 | 641.81 | 360.77 | 720.17 | 0.02 |
| 2.4 | 2180 | −12.9 | −767.37 | −359.46 | 769.82 | 360.62 | 720.08 | 0.01 |
| 2.8 | 2180 | −12.84 | −894.38 | −359.11 | 897.84 | 360.50 | 719.61 | −0.05 |
| Cylinder (20-foot length, 4.00-inch diameter) | | | | | | | | |
| 2.0 | 425 | −8.6 | −138.64 | −121.32 | 135.64 | 118.69 | 240.01 | 0.00 |
| 2.4 | 425 | −11.1 | −166.66 | −121.53 | 162.66 | 118.61 | 240.14 | 0.06 |
| 2.8 | 425 | −11.3 | −194.69 | −121.69 | 189.69 | 118.56 | 240.25 | 0.10 |
| Plate (8-foot height by 8.0156-foot wide, ~square) | | | | | | | | |
| 2.0 | 525 | −8.2 | −90.588 | −48.982 | 87.59 | 47.361 | 96.34 | 0.16 |
| 2.4 | 525 | −8.33 | −108.61 | −48.937 | 104.605 | 47.134 | 96.07 | −0.12 |
| 2.8 | 525 | −8.04 | −126.62 | −48.905 | 121.623 | 46.974 | 95.88 | −0.32 |

Figure 6:
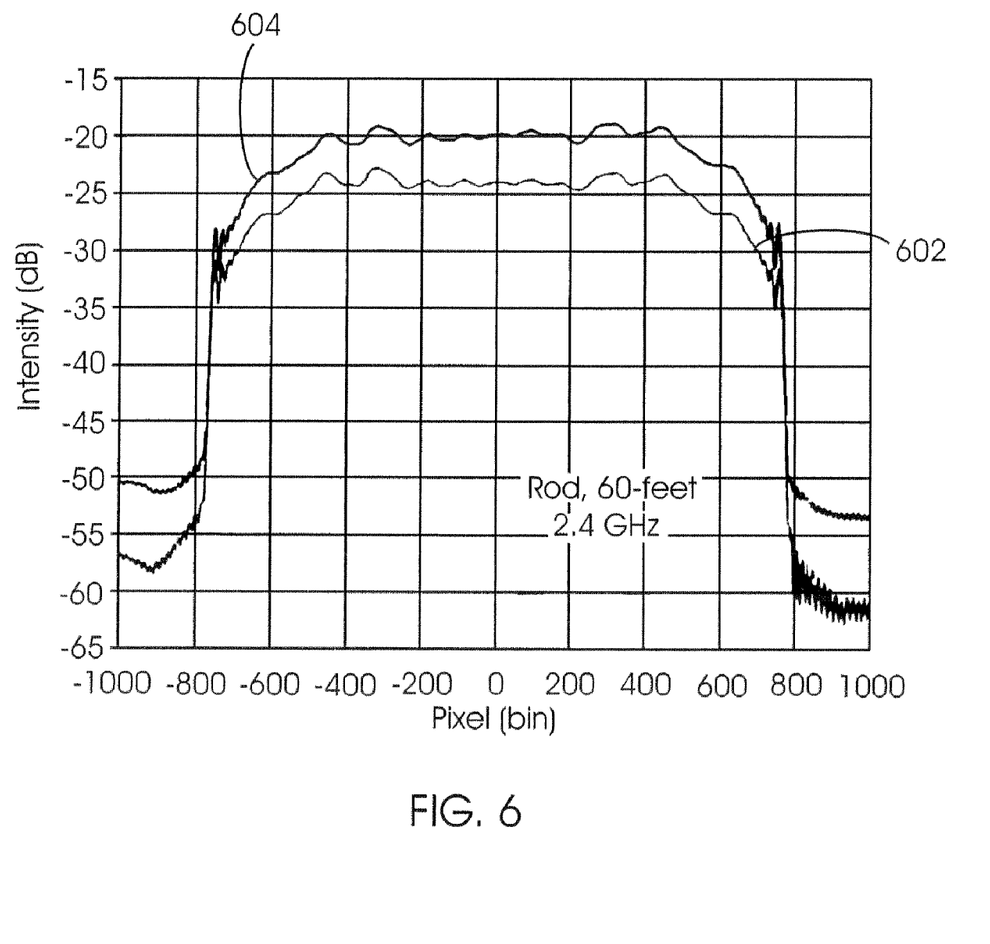
FIG. 6 shows the Fourier transform spectra using the 2.4 GHz data, such as plotted in part in FIG. 5 in accordance with an embodiment of the present invention.

FIG. 6 shows the Fourier transform spectra using the 2.4 GHz data, such as plotted in part in FIG. 5. Within the azimuth of ±20, there are 2180 pairs of I and Q. It is zero-padded to $2^{14}=16384$ to increase the granularity (but not the resolution). The complete spectrum goes from bias −8192 to 8192, but only the central portion within ±800 bins exhibits a plateau at about 35 dB above the noise floor. To avoid overlap, the VV 602 is shifted down by −3 dB. The plot appears similar to the HH 604. Though the plateau is fairly flat at the center, it drops off quickly on the two sides. The oscillatory structure near bins ±750 are commonly known as the Gibb's phenomena due to the finite length of rigid body 300.

Figure 7:
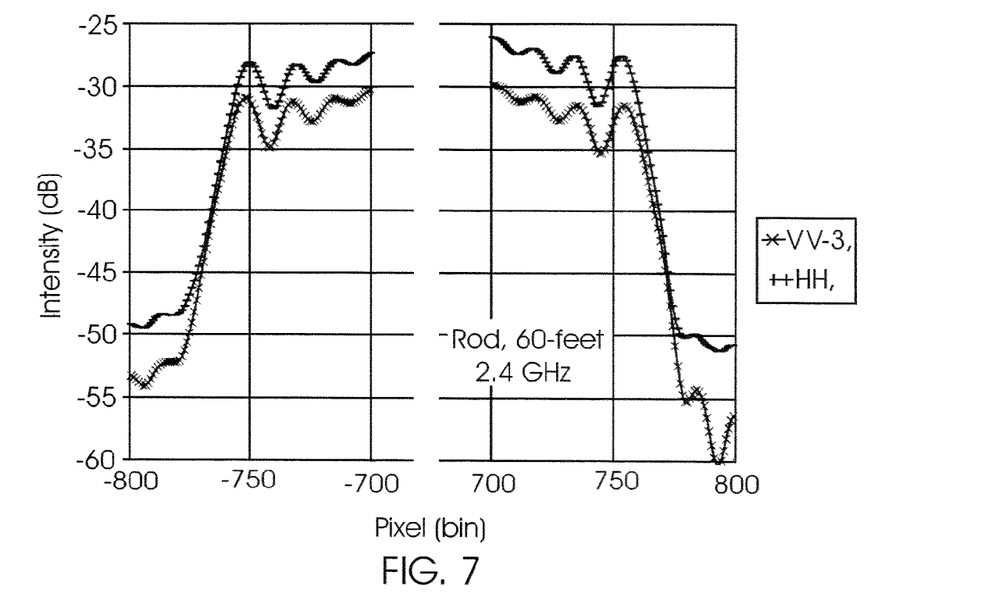
FIG. 7 is an extended view of the two ends in the Fourier transform spectra at 2.4 GHz from results of FIG. 6 in accordance with an embodiment of the present invention.

FIG. 7 is an extended view of the two ends in the Fourier transform spectra at 2.4 GHz from results of FIG. 6 to provide an understanding on the Gibb's phenomena and the influence on distance calibration, with the computed points in the Fourier transform spectra denoted by symbols.

Figure 9:
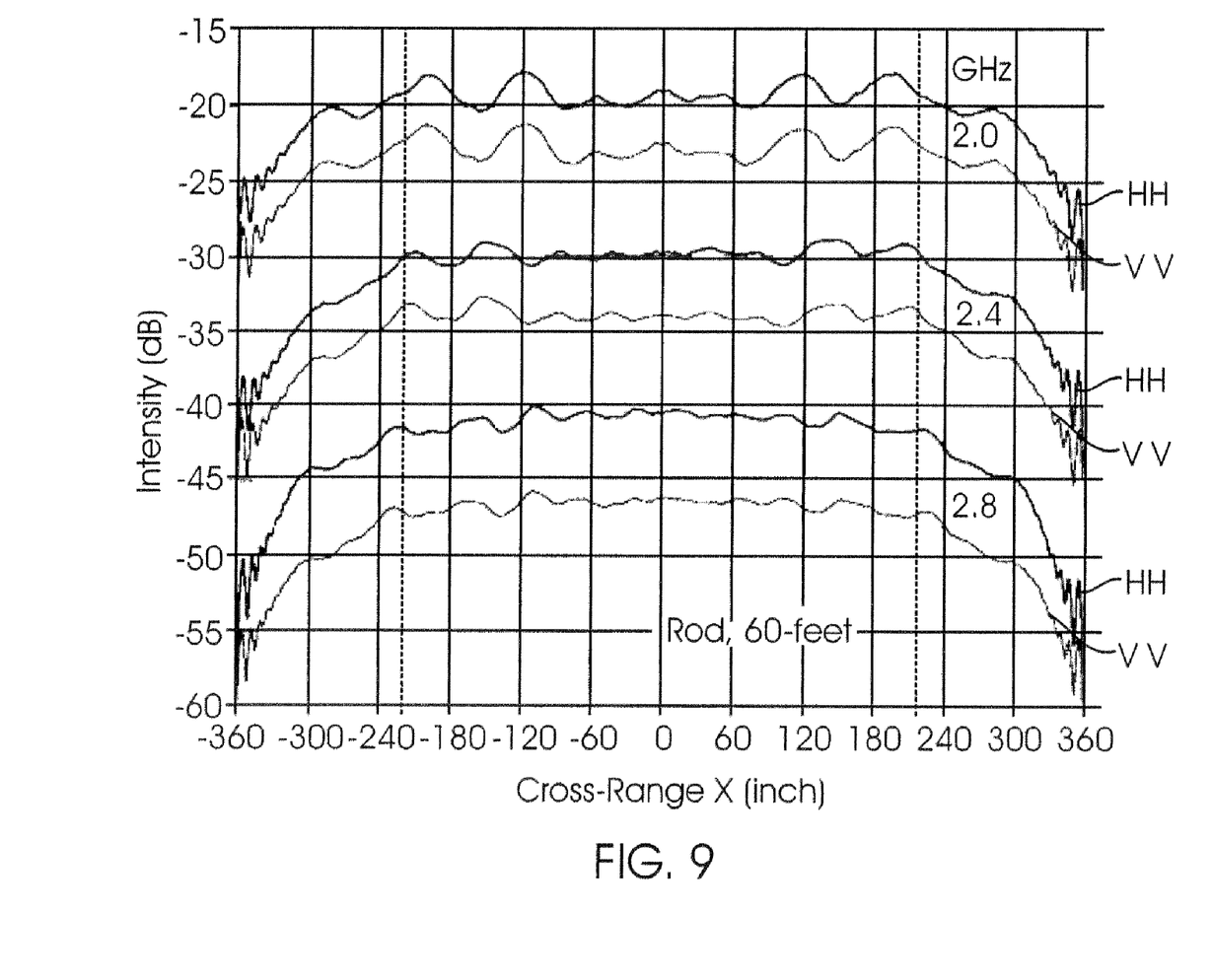
FIG. 9 shows Fourier transform spectra for the 60-foot rod at three representative frequencies (2.0, 2.4, and 2.8 GHz) after calibration of the cross-range distance in accordance with an embodiment of the present invention.
Figure 10:
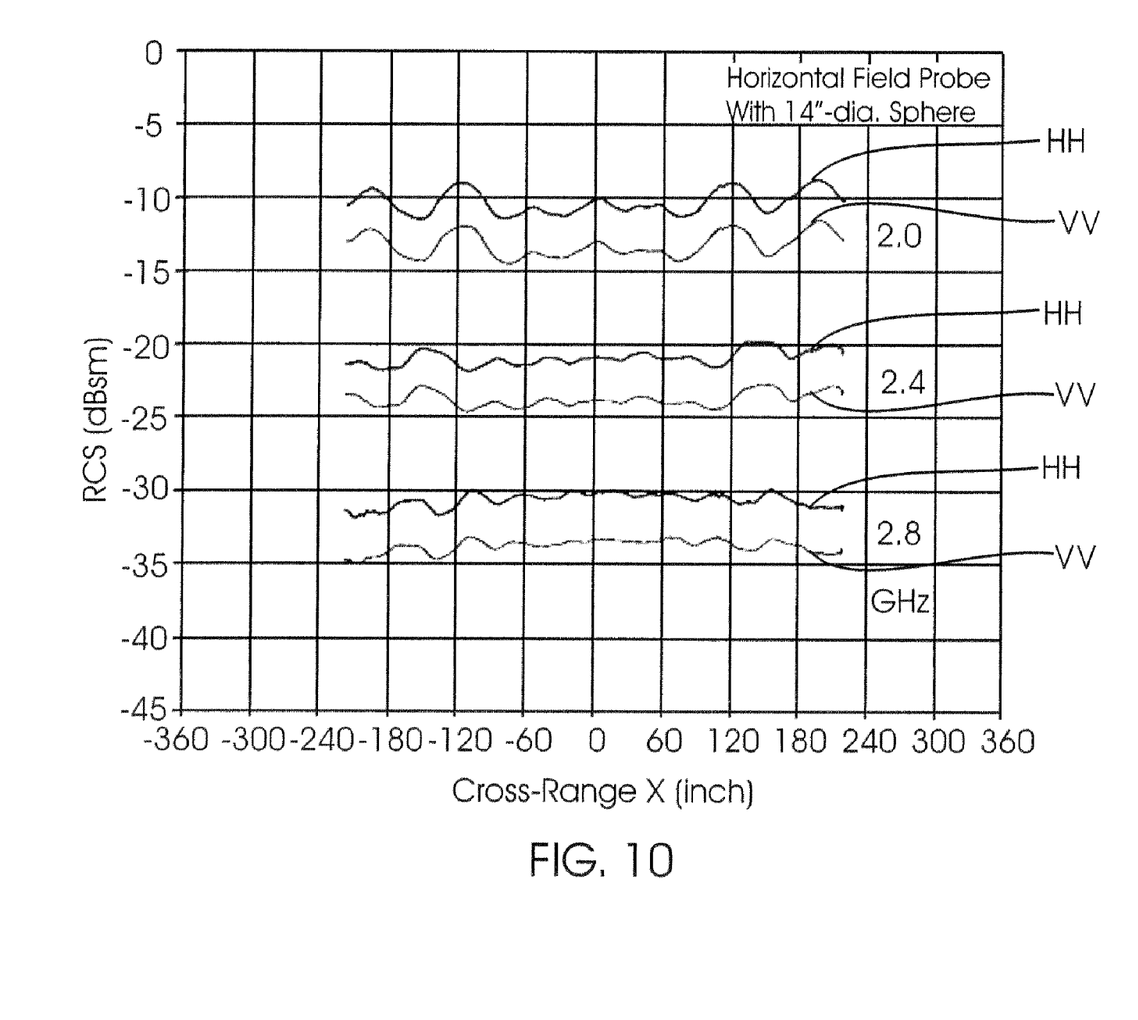
FIG. 10 shows horizontal field-probes measured at three frequencies (2.0, 2.4, and 2.8 GHz) by translating a 14-inch sphere supported by strings within the distance of ±220 inch in accordance with an embodiment of the present invention.

Since the objective is to generate a profile of the incident power in the test zone as a function of cross-range location, the cross-range distance to bin number is expressed using the appropriate formula as follows:

$$R/\lambda = J*(D_a-1)/(2W*A*N), \quad (1)$$

where R is the cross-range distance, $\lambda(=c/F)$ is the radar wavelength, J is the bin number measured from zero, N(=power of 2, zero-padded) is the total size of the data set, Da is the number of measured data points, A is the UTT-angle After the cross-range distances are calibrated for the three rigid bodies, the new results on the field distribution represented by the Fourier transform spectra can be plotted on the same scales for easy comparisons among the different targets. In FIG. 9 (for the 60-foot long rod), FIG. 11 (for the 20-foot long cylinder), and FIG. 12 (for the 8-foot square flat plate), the ordinates are all in 5 dB/div., while the abscissa are all plotted between ±360 inches. For the comparison with the horizontal field-probes using the 14-inch sphere, the results are plotted on the same scales in FIG. 10.

In FIGS. 9-12, the ordinate scale (y-axis) is for the HH trace at 2.0 GHz, while the HH's for 2.4 and 2.8 are shifted down successively by −10 dB each. The VV traces are shifted down by −3 dB each from the corresponding HH. The residuals on the outside of the region of interest (abscissa ±360 inches) are not included.

In FIG. 9, the results are plotted at about 0.5 inch per pixel, which is in very high resolution. Two dashed lines are used to mark the cross-range boundaries of ±220 inches, within which 14-inch sphere field-probes was previously tested. Comparing FIGS. 9 and 10 it is clear that the 60-foot long rod provides the same horizontal field-probe results as the sphere, even on a higher resolution and for a wider coverage. The agreement of the traces validates the method of the present invention.

Figure 11:
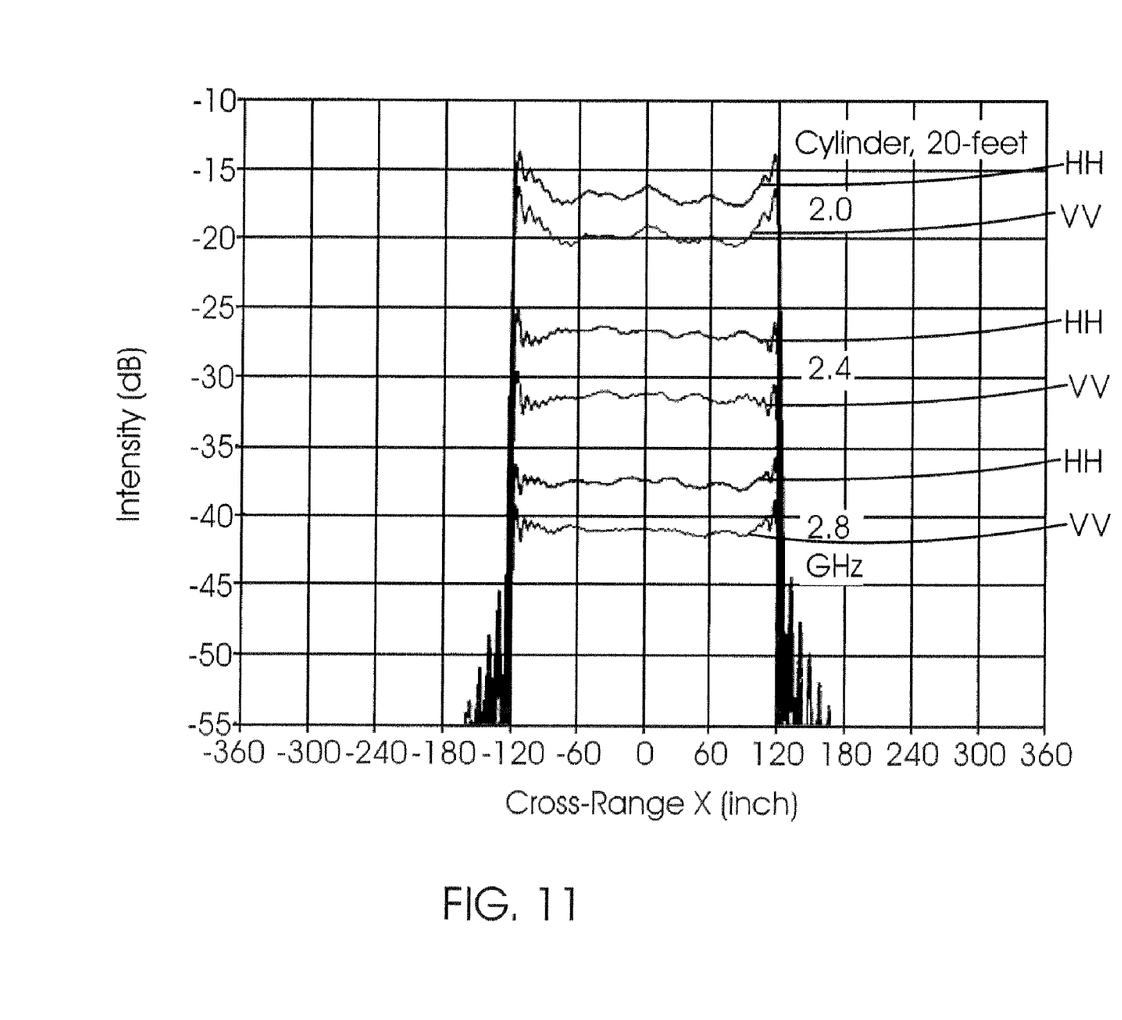
FIG. 11 shows Fourier transform spectra for the 20-foot cylinder (supported horizontally by strings and measured at three frequencies) as a function of the cross-range distance in accordance with an embodiment of the present invention.
Figure 12:
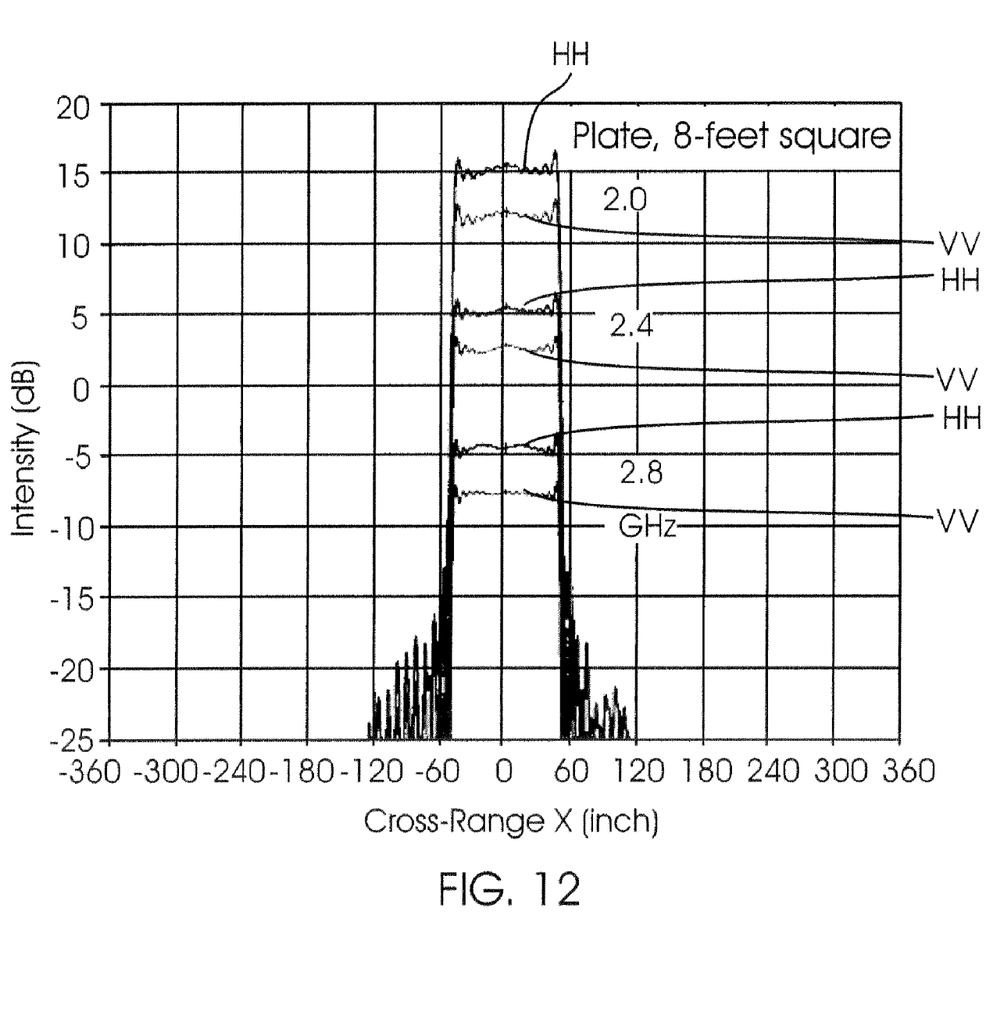
FIG. 12 shows Fourier transform spectra for the 8-foot by 8-foot flat plate at three frequencies as a function of the cross-range distance in accordance with an embodiment of the present invention.

In FIG. 11 where rigid body 300 is the 20-foot cylinder, the central parts of the traces carry the same resemblance of the field within about ±70 inches. Beyond that, the Gibb's phenomena mix in with the "true" field effect. The field thus sampled is an "average" over the vertical height of 4-inches. In FIG. 12 where rigid body 300 is the 8-foot square plate, the Gibb's phenomena from the two ends meet in the center to totally mask the "true" response from the field. If a wider plate is used to extend the horizontal dimension, then the field sampled would be an "average" over its height.

Accordingly, upon viewing the RCS data collected on the three types of rigid body 300, each within a small azimuth-angle around the broadside condition, it is understood that the Fourier transform spectra on these data show a new promise for doing the "average" field probes better, faster, and more accurate. The results show that the angular dependence of the radar echo can be exploited regardless of the geometric shape (a cylinder or a plate).

It should also be understood that the method of the present invention is not limited to a type of material for rigid body 300. It has been shown that both metal and/or dielectrics may be used. Further, by rotating the target with UTT 116, there is a small contribution to the Fourier spectrum due to the stationary point on the target, which is superimposed on the field response at that point. Using strong scatterers, such as used in the present invention, that contribution is minimal. Plotting the RCS data from a target translated along a given path produces a 2-way field-probe (relative ripples in dB versus distance) as an "average" over the physical area of that target (e.g., a sphere or a corner reflector).

The method of the present invention for using the Fourier transform spectrum from the RCS measurements of a horizontal long-and-uniform rigid-body rotated within a small angle about the broadside condition also generates a 2-way field-probe, but of different resolutions. In the vertical, it is an "average" over the diameter of the rod (or the projected height of the object). In the horizontal, the sub-inch resolution is defined by the combination of the rotation rate in azimuth and the radar sampling time, which can be adjusted to higher or lower values as desired.

Although the rotation of rigid-body 300, of uniform scattering property and supported by strings 302, in the horizontal plane has been described, the same method can be generalized to the rotation of a rigid body in the vertical plane. For the radar ranges not equipped with strings 302, but having a lower turntable 118 (FIG. 1), rigid body 300 may be supported on one or more foam tower(s) and rotated.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. A method for determining characteristics of a radar wave field in a radar test range, the method comprising:
    suspending a rigid body from a plurality of locations along a length of the rigid body so as to permit ends of the rigid body to freely rotate about an axis located about a center point of the rigid body and approximately perpendicular to a direction of travel of expected incident radar waves;
    generating incident radar waves at a desired frequency;
    rotating the rigid body about the axis perpendicular to the direction of travel of the generated incident radar waves;
    sensing the angle of the rigid body;
    collecting return information of the rigid body based on the sensed angle of the rigid body relative to the incident radar waves at the desired frequency; and
    determining characteristics of the radar wave field based on the collected return information.

2. The method of claim 1, further comprising determining the characteristics of radar wave field including determining intensity of the incident radar waves along the rigid body.

3. The method of claim 2, wherein determining intensity of the incident radar waves includes performing Fast Fourier Transforms.

4. The method of claim 1, wherein radar wave field is included within at least one of an indoor or outdoor radar test range.

5. The method of claim 1, wherein suspending the rigid body includes suspending the rigid body from a turntable configured to rotate the rigid body about the center point thereof.

6. The method of claim 1, wherein the rigid body comprises a rod, a cylinder or a flat plate.

7. The method of claim 1, wherein the rigid body is made of a material comprising a metal or a dielectric material.

8. A system for determining characteristics of a radar wave field in a radar test range, the system comprising:
    a rigid body, the rigid body suspended in the radar wave field from a plurality of locations along a length of the rigid body so as to permit ends of the rigid body to freely rotate about an axis located about a center point of the rigid body;
    a radar system configured to generate incident radar waves at a desired frequency in a direction approximately perpendicular to the axis of rotation of the suspended rigid body;
    a device configured to rotate the rigid body about the axis to receive the generated incident radar waves;
    and a sensor-processor subsystem to determine characteristics of the radar wave field.

9. The system of claim 8, wherein the sensor-processor subsystem-comprising:
    a sensor configured to sense the angle of the rigid body; and
    a processor including:
        a first component configured to collect return information of the rigid body based on the sensed angle of the rigid body; and
        a second component configured to determine characteristics of radar wave field based on the collected return information.

10. The system of claim 9, wherein the second component is further configured to determine intensity of the incident radar waves along the rigid body.

11. The system of claim 9, wherein the collected information includes an in-phase component and a quadrature component, and the second component includes a means for performing Fast Fourier Transforms of the in-phase and quadrature components.

12. The system of claim 8, wherein radar system is further configured to step the generating incident radar waves through a plurality of desired frequencies separated by a pre-defined frequency interval.

13. The system of claim 8, wherein the rigid body is suspended from a turntable configured to rotate the rigid body about the axis located about the center point thereof.

14. A radar test range including a wave field, radar test range comprising:
    a rigid body, the rigid body suspended in the radar wave field from a plurality of locations along a length of the rigid body so as to permit ends of the rigid body to freely rotate about an axis located about a center point of the rigid body and approximately perpendicular to the direction of travel of an expected incident radar wave, the rigid body configured to rotate in-and-out of the broadside condition;

a device configured to rotate the rigid body about the axis and in-and-out of a broadside condition;

a radar for generating incident radar waves at a desired frequency in a direction approximately perpendicular to the axis of rotation of the rigid body; and a processor coupled for collecting return information of the rigid body from a sensor based on the sensed angle of the rigid body and determining characteristics of the radar wave field based on the collected return information of the rigid body.

15. The radar test range of claim 14, wherein the processor further determines intensity of the incident radar waves along the rigid body.

16. The radar test range of claim 15, wherein the collected information includes an in-phase component and a quadrature component and the processor further performs Fast Fourier Transforms of the in-phase and quadrature components.

17. The radar test range of claim 14, wherein the rigid body is suspended using a plurality of set of strings arranged at non-flashing angles to the radar wave.

18. The radar test range of claim 17, wherein the plurality of set of strings include a high capacity set of strings and a low capacity set of strings, with the high capacity set of strings configured to support substantially higher load than the low capacity set of strings.

19. The radar test range of claim 18, wherein the high capacity set of strings are located closer to the center point of the rigid body than the lower capacity set of strings.

20. The method of claim 1, wherein suspending a rigid body further comprising using a plurality of set of strings arranged at non-flashing angles to the radar wave.

21. The system of claim 8, wherein the rigid body is suspended using a plurality of set of strings arranged at non-flashing angles to the radar wave.

* * * * *

UNITED STATES PATENT AND TRADEMARK OFFICE
CERTIFICATE OF CORRECTION

PATENT NO. : 7,498,977 B2  Page 1 of 1
APPLICATION NO. : 11/465417
DATED : March 3, 2009
INVENTOR(S) : Wei et al.

It is certified that error appears in the above-identified patent and that said Letters Patent is hereby corrected as shown below:

On the Title Page, Item (54)

The title "FIELD PROBE FORM THE ANGULAR RESPONSE OF A RIGID BODY" should read as "FIELD PROBE FROM THE ANGULAR RESPONSE OF A RIGID BODY".

Signed and Sealed this

Twenty-first Day of April, 2009

JOHN DOLL
*Acting Director of the United States Patent and Trademark Office*